US006990440B1

(12) United States Patent
Sroka

(10) Patent No.: US 6,990,440 B1
(45) Date of Patent: Jan. 24, 2006

(54) SELF-ORGANIZING AND AUTOMATICALLY CROSS-REFERENCING INFORMATION MANAGEMENT SYSTEM

(76) Inventor: Alexander Sroka, 30350 Hunters Dr., Apt#3122, Farmington Hills, MI (US) 48334

(*) Notice: Subject to any disclaimer, the term of this patent is extended or adjusted under 35 U.S.C. 154(b) by 1020 days.

(21) Appl. No.: 09/639,961

(22) Filed: Aug. 16, 2000

(51) Int. Cl.
*G06F 17/28* (2006.01)

(52) U.S. Cl. ................................ 704/4; 707/10; 705/8

(58) Field of Classification Search .................... 704/4, 704/7, 9, 10; 707/7, 102, 10; 705/8, 9

See application file for complete search history.

(56) References Cited

U.S. PATENT DOCUMENTS

| | | | | |
|---|---|---|---|---|
| 5,115,504 A | | 5/1992 | Belove et al. | 395/600 |
| 5,799,268 A | * | 8/1998 | Boguraev | 704/9 |
| 6,085,166 A | * | 7/2000 | Beckhardt et al. | 705/9 |
| 6,735,593 B1 | * | 5/2004 | Williams | 707/102 |

* cited by examiner

*Primary Examiner*—Abul K. Azad

(57) ABSTRACT

A software and/or hardware database system and method (Database) having a design and algorithms to access information in the Database utilizes a model of the reality. The Database is self-organizing. The Database content is dynamic and effectively changes the Database itself. The Database uses concepts of nouns, verbs and context to classify information. The Database includes automatic cross-referencing algorithms to relate categories and items of information.

6 Claims, 20 Drawing Sheets

```
/***********************************************************************
/
/*
*/
/*            BRAIN     Schema for the database BRAIN.
*/
/*                      Global schema for every neuron.
*/
/*
*/
/*  Identyfication:
*/
/*                   1000-0-00-00-00
*/
/*                   ---- - -- -- --       neuron   0001/.../1000
*/
/*                                         portion  0/1/2
*/
/*                                         relation 00/10/.../54
*/
/*                                         release   1
*/
/*                                         version   1
*/
/*
*/
/*             Portion      1
*/
/*                          0             Abstraction
*/
/*                          1             Reality
*/
/*                          2             Abstraction-Reality
relation*/
/*
*/
/*             Part         11            Noun+Data+Doc
*/
/*                          10            Noun
*/
/*                          14            Noun-Data
*/
/*                          15            Noun-Doc
*/
/*                          40            Data
*/
/*                          45            Data-Doc
*/
/*                          50            Doc
*/
/*
*/
/*             Release      01
*/
```

FIG. 17A

```
/*                          01              Alpha release
*/
/*                          02              Beta  release
*/
/*
*/
/*              Version     01
*/
/*                          01              Alpha version
*/
/*                          02              Beta  version
*/
/*
*/
/***********************************************************************
/
/* Module name : Brain Agenda - Personal Information Manager
*/
/*                NEURON_1000
*/
/***********************************************************************
/
/* Implemented : RAIMA, db_VISTA III
*/
/*
*/
/* Compile type: ddp
*/
/*                def. ddlp -rxbds brain.ddl
*/
/*                     -r - report
*/
/*                      x - cross reference
*/
/*                      b - no alignment
*/
/*                      d - dupl. field names
*/
/*                      s - case preserve
*/
/***********************************************************************
/
/* 1. | BRAIN   | 1991.09.01 | New
*/
/***********************************************************************
/
/* 1000-0-00-00-00    6144*/
database BRAIN [6144]
  {
    data file "F100010.00" contains
/* 1000-0-10-00-00 */
                                          noun;
    data file "F100011.00" contains
/* 1000-0-11-00-00 */
```

FIG. 17B

```
                             datar,
                             datar_tabl;
    data file "F100012.00" contains
/* 1000-0-11-00-00 */
                             noun_datar,
                             noun_str,
                                          noun_synonim,
                             datar_str,
                                          action_before,
                             action_after;

     data file "F100019.00" contains
/* 1000-0-10-00-00 */
                             brain,
/* 1000-0-50-00-00 */
                             note;

    key  file "F100010.00K" contains
                             noun.id;
    key  file "F100011.00K" contains
                             datar.id;
    key  file "F100019.00K" contains
                             note.id;
/***********************************************************************
/
/* Sub-schema  : BRAIN - NOUN
*/
/* Description : Noun (Parameter) part of BRAIN
*/
/***********************************************************************
/
/* Record type : brain
*/
/* Description : Start of the NEURON  1000
*/
/***********************************************************************
/
    record brain
      {
      char           db_path [81];      /* Path to database         */
      char           db_name [81];      /* name of the db "brain"   */
      struct
          {
          long           type_v;       /* noun type, view id       */
          char           kname_v [41]; /* noun 40B + 1B null termin*/
          long           subtype_v;    /* noun subtype, def = 0    */
        } id_v;
          char           name_v [256]; /*                          */
        struct
          {
          long           type_n;       /* noun type, name id       */
          char           kname_n [41]; /* noun 40B + 1B null termin*/
          long           subtype_n;    /* noun subtype, def = 0    */
          long           type2_n;      /* noun 2 type, def = 0     */
```

FIG. 17C

```
        char          kname2_n [41];/* noun 40B + 1B null termin*/
        long          subtype2_n;   /* noun subtype, def = 0    */
        } id_n;
          char          name_n [256];   /*
*/
      long          read_action;       /* action on load          */
      long          next_1;            /* next available ???      */
      long          next_2;            /* number for extention    */
      long          next_3;            /* noun ext.,noun definition*/
      long          value_1 ;          /*                         */
      long          value_2 ;          /*                         */
      long          value_3 ;          /*                         */
      double        double_1;          /*                         */
      double        double_2;          /*                         */
      double        double_3;          /*                         */
      char          reserve_1[41];     /*                         */
      char          reserve_2[41];     /*                         */
      char          free[5001];        /*                         */
      }
/**********************************************************************
/
/* Record type : noun
*/
/* Description : names (views,names,contexts)
*/
/**********************************************************************
/
    record noun
      {
        unique key struct
          {
          long          type;        /* noun type, def = 0       */
          char          kname [41]; /* noun 40B + 1B null termin*/
          long          subtype;     /* noun subtype, def = 0    */
          long          type2;       /* noun 2 type, def = 0     */
          char          kname2 [41];/* noun 40B + 1B null termin*/
          long          subtype2;    /* noun subtype, def = 0    */
          } id;
          char          name[256]; /* 255+1                     */
      struct
          {
          long          type_p;        /* noun type, pair id       */
          char          kname_p [41]; /* noun 40B + 1B null termin*/
          long          subtype_p;     /* noun subtype, def = 0    */
        } id_p;
            long   cf;                 /* certainity factor        */
            long   delete;             /*                          */
            long   joint_id;           /* neuron||joint     long   */
            long   read_action;        /* action on read           */
            double date_create;        /*                          */
            double date_when;          /*                          */
            double date_done;          /*                          */
            double date_start;         /*                          */
            double date_end;           /*                          */
```

FIG. 17D

```
        char     short_name [21];     /*            1B null termin*/
        char     cat_type [11];       /*            1B null termin*/
        char     exclusive [2];       /*            1B null termin*/
        char     settings [41];       /*            1B null termin*/
        long     layout_link;    /* type of layout for linked note*/
    struct
      {
        long          type_link;      /* link to extention which  */
        char          kname_link [41];/* is in note               */
        long          subtype_link;   /*reserve the range of notes*/
      } id_link;
    struct
      {
          long   type_note;         /* note id                  */
          char   kname_note [41];   /* note name                */
          long   subtype_note;      /* note page                */
      } id_note;
          long   position_note;     /*         in document/page */
          char   free_1   [101];
          char   free_2   [101];
          char   reserve_1[21];     /*3 sets person company     */
          char   reserve_2[11];     /*       notes (commence)   */
          char   reserve_3[11];     /*       notes (commence)   */
    }
/**********************************************************************
/
/* Record type : datar                                    */
/* Description : records from Brain Agenda
*/
/**********************************************************************
/
    record datar
      {
        unique key struct
          {
          long          type;       /* data type, def = 0       */
          char          kname [41]; /* data 40B + 1B null termin*/
          long          subtype;    /* data subtype, def = 0    */
        } id;
          char          name[256]; /* 255+1                    */
                long   cf;               /* certainity factor
*/
            long   delete;            /*                          */
                long   joint_id;          /* neuron||joint     long
*/
            long   read_action;       /* action on read           */
            double date_create;       /*                          */
            double date_when;         /*                          */
            double date_done;         /*                          */
            double date_start;        /*                          */
            double date_end;          /*                          */
            char   settings [41];     /*           1B null termin*/
    struct
      {
```

FIG. 17E

```
            long   type_note;          /* note id                  */
            char   kname_note [41];    /* note name                */
            long   subtype_note;       /* note page                */
        } id_note;
            long   position_note;      /*        in document/page */
            long   long_1;             /*                          */
            char   reserve_1[11];      /*                          */
            char   reserve_2[11];      /*                          */
            char   reserve_3[11];      /*                          */
            char   reserve_4[11];      /*                          */
    }
/***********************************************************************
/
/* Record type : datar_tabl                                        */
/* Description : data tables
*/
/***********************************************************************
/
    record datar_tabl
      {
            long   elem [120];         /* 120 elements             */
            long   cf;                 /* certainity factor        */
            long   delete;             /*                          */
            double date_create;        /*                          */
            long   read_action;        /* action on read           */
            double double_1;           /*                          */
            char   reserve_1[11];      /*                          */
            char   reserve_2[21];      /*                          */
    }
/***********************************************************************
/
/* Record type : note
*/
/* Description : notes (pages ) document
*/
/***********************************************************************
/
    record note
        {
        unique key struct
          {
          long          from;       /* doc id +datar,-name,0-user  */
          long          type;       /* from record or name         */
          char          kname [41]; /* chapter||paragraph||verse
blank*/
          long          subtype;    /* for user=0                  */
          long          page_nr;    /* page nr                     */
        } id;
          char          name [256];    /*                          */
            long   cf;                /* certainity factor       */
            char   chapter  [101];    /*     left on page        */
            char   chapter_1[101];    /*     left on page        */
            char   chapter_2[101];    /*     left on page        */
            char   chapter_3[101];    /*     left on page        */
```

FIG. 17F

```
        char   chapter_4[101];   /*     left on page          */
        char   chapter_5[101];   /*     left on page          */
        char   chapter_6[101];   /*     left on page          */
        long   verse;            /*     left on page          */
        char   page [5001];      /* page   5001               */
        long   delete;           /*                           */
        long   read_action;      /* action on read            */
        char   reserve_1 [11];
        char   reserve_2 [11];
        char   reserve_3 [11];
        char   reserve_4 [11];
     }
/*********************************************************************
/
/* Record type : noun_str
*/
/* Description : structure of the noun
*/
/*********************************************************************
/
   record noun_str
     {
        long   cf;               /* certainity factor        */
        double date_create;      /*                          */
        long   read_action;      /* action on read           */
        double double_1;         /*                          */
        char   reserve_2[11];    /*                          */
        char   reserve_3[11];    /*                          */
     }
/*********************************************************************
/
/* Record type : noun_datar
*/
/* Description : relation noun - datar                       */
/*********************************************************************
/
   record noun_datar
     {
        long   cf;               /* certainity factor        */
        double date_create;      /*                          */
        long   read_action;      /* action on read           */
        double double_1;         /*                          */
        char   reserve_2[11];    /*                          */
        char   reserve_3[11];    /*                          */
     }
/*********************************************************************
/
/* Record type : action before
*/
/* Description : must belong to the datar before being assigned to
*/
/*             the current datar                        */
/*********************************************************************
/
```

FIG. 17G

```
    record action_before
      {
            long   cf;                  /* certainity factor        */
            double date_create;         /*                          */
            long   read_action;         /* action on read           */
            double double_1;            /*                          */
            char   reserve_2[11];       /*                          */
            char   reserve_3[11];       /*                          */
      }
/***********************************************************************
/
/* Record type : noun action after
*/
/* Description : is assigned to noun after being assigned to
*/
/*                the current noun
*/
/***********************************************************************
/
    record action_after
      {
            long   cf;                  /* certainity factor        */
            double date_create;         /*                          */
            long   read_action;         /* action on read           */
            double double_1;            /*                          */
            char   reserve_2[11];       /*                          */
            char   reserve_3[11];       /*                          */
      }
/***********************************************************************
/
/* Record type : noun_synonim
*/
/* Description : all synonims for a noun
*/
/***********************************************************************
/
    record noun_synonim
      {
            long   cf;                  /* certainity factor        */
            double date_create;         /*                          */
            long   read_action;         /* action on read           */
            double double_1;            /*                          */
            char   reserve_2[11];       /*                          */
            char   reserve_3[11];       /*                          */
      }
/***********************************************************************
/
/* Record type : datar_str
*/
/* Description : structure of the datar
*/
/***********************************************************************
/
    record datar_str
```

FIG. 17H

```
      {
            long   cf;              /* certainity factor        */
            double date_create;     /*                          */
            long   read_action;     /* action on read           */
            double double_1;        /*                          */
            char   reserve_2[11];   /*                          */
            char   reserve_3[11];   /*                          */
      }
/*****************************************************************************
/
/* Set type    : noun_set
*/
/* Description : Search path for noun
*/
/*****************************************************************************
/
    set noun_set
      {
        order descending;
        owner brain;
      member noun by cf;
      }
/*****************************************************************************
/
/* Set type    : datar set
*/
/* Description : Search path for datar record
*/
/*****************************************************************************
/
    set datar_set
      {
        order descending;
      owner noun;
      member noun_datar by cf;
      }
/*****************************************************************************
/
/* Set type    : datar_noun set
*/
/* Description : Search path for noun from datar
*/
/*****************************************************************************
/
    set datar_noun_set
      {
        order descending;
      owner datar;
      member noun_datar by cf;
      }
/*****************************************************************************
/
/* Set type    : noun_synonim_exp_set
*/
```

FIG. 17I

```
/* Description : Search path for noun synonim explosion
*/
/*********************************************************************
/
    set noun_synonim_exp_set
      {
        order descending;
      owner noun;
      member noun_synonim by cf;
      }
/*********************************************************************
/
/* Set type    : noun_synonim_imp_set
*/
/* Description : Search path for noun synonim implosion
*/
/*********************************************************************
/
    set noun_synonim_imp_set
      {
        order descending;
      owner noun;
      member noun_synonim by cf;
      }
/*********************************************************************
/
/* Set type    : noun_exp_set
*/
/* Description : Search path for noun explosion
*/
/*********************************************************************
/
    set noun_exp_set
      {
        order descending;
      owner noun;
      member noun_str by cf;
      }
/*********************************************************************
/
/* Set type    : noun_imp_set
*/
/* Description : Search path for noun record from noun_str
*/
/*********************************************************************
/
    set noun_imp_set
      {
        order descending;
      owner noun;
      member noun_str by cf;
      }
/*********************************************************************
/
```

FIG. 17J

```
/* Set type    : datar_exp_set
*/
/* Description : Search path for datar explosion
*/
/*******************************************************************
/
    set datar_exp_set
      {
        order descending;
      owner datar;
      member datar_str by cf;
      }
/*******************************************************************
/
/* Set type    : datar_imp_set
*/
/* Description : Search path for datar record from datar_str
*/
/*******************************************************************
/
    set datar_imp_set
      {
        order descending;
      owner datar;
      member datar_str by cf;
      }
/*******************************************************************
/
/* Set type    : action_before_exp set
*/
/* Description : Search path for action_before from noun
*/
/*******************************************************************
/
    set action_before_exp_set
      {
        order descending;
      owner noun;
      member action_before by cf;
      }
/*******************************************************************
/
/* Set type    : action_before_imp set
*/
/* Description : Search path for action_before from noun
*/
/*******************************************************************
/
    set action_before_imp_set
      {
        order descending;
      owner noun;
      member action_before by cf;
      }
```

FIG. 17K

```
/*********************************************************************
/
/* Set type    : action_after_exp set
*/
/* Description : Search path for action_after from noun
*/
/*********************************************************************
/
    set action_after_exp_set
      {
        order descending;
      owner noun;
      member action_after by cf;
      }
/*********************************************************************
/
/* Set type    : action_after_imp set
*/
/* Description : Search path for action_after from noun
*/
/*********************************************************************
/
    set action_after_imp_set
      {
        order descending;
      owner noun;
      member action_after by cf;
      }
/*********************************************************************
/
/* Set type    : datar_tabl set
*/
/* Description : Search path for datar_tabl from datar
*/
/*********************************************************************
/
    set datar_tabl_set
      {
        order descending;
      owner datar;
      member datar_tabl by cf;
      }
/* 1000-0-00-00-00 */
  }
/*********************************************************************
/
/* End of Schema: Brain Agenda
*/
/*********************************************************************
/
```

FIG. 17L

SELF-ORGANIZING AND AUTOMATICALLY CROSS-REFERENCING INFORMATION MANAGEMENT SYSTEM

FIELD OF THE INVENTION

This invention relates to computer programs, specifically to computer information management systems which organize and access information stored in computer systems.

BACKGROUND

Computer systems sometimes organize data into categories and items related to such categories. Categories may be organized in hierarchies or structures. For example, category "Companies" may contain a list of specific company names, like "Financial Services, Inc.", "Environment Care Corp." and "Computer Maintenance, Inc.". Items are specific textual strings containing a single word, two, three or up to a couple of hundred words, text, or other information pieces.

Prior art systems do not efficiently handle a practically unlimited number of categories and items and/or cannot cross-reference such a large number of categories and items.

Currently, the prevailing implementations for Information Management Systems handling diversified pieces of information on personal computers are Personal Information Managers (PIM). No single product on the market fulfills the requirements of easy interface, database strength, extendibility, flexibility or other specific features, such as handling practically an unlimited number of categories and items or, more importantly, automatically storing cross-referencing between categories and items.

There are/were the following major competitors in existing PIM's market for personal computers:

- Maximizer®—with a strong Btrieve database, but no cross-referencing;
- Lotus Organizer®—with a strong visual interface, but no database and no cross-referencing;
- Act!®—with a database and contact manager, but no cross-referencing;
- Lotus Agenda®—with (DOS-based) cross-referencing, no database, now obsolete;
- ECCO®—with, arguably, the best interface, but no database;
- Lotus Notes®—not a PIM, but provides intelligent e-mail and document storing.

Other information managing and scheduling programs are:

- InfoCentral®—which provides information outlining,
- Schedule+®—which provides networked scheduling,
- Network Scheduler® 3—which provides networked scheduling.

Lotus Agenda®, when it was commercially available, was protected by the U.S. Pat. No. 5,115,504 issued to Belove et al. The Belove patent discloses a methodology to accomplish a similar task as the present invention. However, the Belove methodology uses a different system implemented in a DOS based database. The design of the Belove system was cumbersome, limited to a linking file system and did not utilize a modern network data model design.

Act!® is recommended only for sale force automation. Maximizer® is recommended for a broad spectrum of tasks. Lotus Organizer® is preferred by some users. An easy to use interface is the single most important factor for the mass-market users. The database and networking capabilities are les important.

The invention is directed to overcoming one or more of the problems as set forth above.

SUMMARY OF THE INVENTION

To solve one or more of the problems set forth above, a software and/or hardware database (Database) with a design and algorithms to access information in the Database is provided. The Database is a model of reality. The most prevalent characteristic of the Database is that it self-organizes information contained in the Database. The Database content is dynamic and effectively changes the Database itself.

Humans always use words and phrases to describe reality. Sentences are built primarily with nouns and verbs. The meaning of what is said depends on the context in which words are used, then it concentrates on a particular view of the things, and finally the things have their names.

A Database according to the invention uses nouns, verbs, context, views and names to classify information. The methodologies employed by the Database is intuitive. If somebody prefers to use a different naming convention, the Database can be adjusted by customizing it. The Database utilizes automatic cross-referencing methodologies to relate categories and items of information. Main design views of the Database are presented here for illustrative purposes.—Other design views which are not presented here, including variations of the main design, are intended to come within the scope of the invention. The look and feel of computer programs which provide a user friendly spreadsheet presentation of the Database information, and particularly Name and Context combo, are described below. A computer system having means for implementing the invention is also described.

Objects of the invention are to reduce redundancy of data storage, improve the performance of retrieving data and automate the process of categorizing information in a way similar to human brain categorization.

Accordingly, several objects and advantages of the invention include the provision of an information management system that provides:

- A network database design, which easily categorizes and stores any number of pieces of information;
- A database system that is closely related to the database structure, with a database design that organizes and structures the way specific pieces of information can be stored and browsed;
- A database system with automatic cross-referencing algorithms that are based on the database design and stores relationships between categories and items, categories and categories, as well as items and items;
- A database system with self-organizing and self-learning algorithms that store statistical access or other information used to reorganize access paths to specific categories, items and their relationships, which such information may be changed;
- A user interface that provides a spreadsheet look and feel to display in rows a hierarchy of categories and items related to the categories, and to display, in columns, categories which may be related to the items through other categories, which generally may be sub-categories of column categories.

A Name and Context combo in a user interface to the Database to accommodate display of different categories (Names), which may have the same Name but different meanings depending on the context in which they are used, the display includes means of viewing and manipulating Name/Context combinations.

A computer software program comprised of computer code for a Personal Information Manager, said program including subroutines for entering, viewing and editing of user data with the spreadsheet interface, for retrieving user data with automatic cross-referencing of data, and for enabling the system to perform self-learning based on statistical access information.

Still further objects and advantages will become apparent from consideration of the ensuing description and accompanying drawings.

BRIEF DESCRIPTION OF THE DRAWINGS

FIGS. 17A–17L show the RAIMA? database data definition language schema for BrainAgenda™ according to principles of the invention.

DETAILED DESCRIPTION

The Figures and the preferred embodiment of a Data Definition Language as described below use standard notation developed by the CODASYL Database Committee. Rectangular boxes in the Figures represent record types, arrows represent relationships between records. Each arrow represents a one-to-many relationship.

Provided below are descriptions of a category structure, categorizing of information, elements of a simplified database, elements of a database, a sample of a database, a theory behind a database, basic cross-referencing algorithms of a database, and self learning algorithms of a database for an information management system according to principles of the invention.

Category Structure

A database user builds his/her business by understanding his/her products and the procedures to deliver them. A database according to principles of the invention produces the Items of information (the product) by learning from the user how the user wants to find the Items (the procedure). Commonly used descriptors such as date and time, or other preloaded database categories do not require any explanation. However other categories, for example, a manager's name or names of companies with which a business deals, may be used only within a specific user's business.

Figure 1:
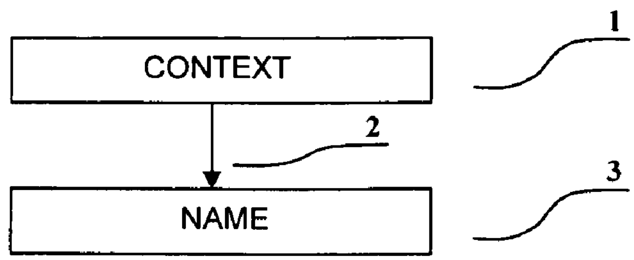
FIG. 1 shows a category structure according to principles of the invention.

The database allows a user to introduce his/her knowledge into a structure, as depicted in FIG. 1. In a specific Context 1, a user can define many Names 3. The Relationship 2 between a Context and Name is one-to-many optional on both sides of the Relationship 2. For example, in Context Work a user can create Names of co-workers, Alex, Barbara, Jan and Agnes.

Figure 2:
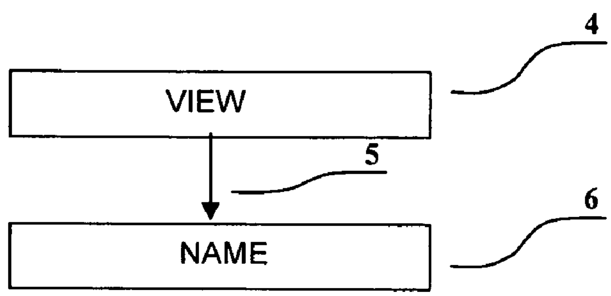
FIG. 2 shows a standard category structure for the View Context according to principles of the invention.

Each Name in the Database has a specific Context assigned to it at the time of creation of the Name in the Database. A View 4 is a collection 5 of Names 6 (and their Contexts) as defined by the user at the time of the specific Name 6 entry. Context may also be used as a View. Typically, View or Context 4 (or 7) is used to provide a collection of Names 6 (or 9) in a required setup 5 (or 8). FIG. 2 conceptually illustrates the category structure within a View or Context. Each Name in View can be used in a different Context. For example, a View Activity can contain Names: Calls, Meetings, Mail and Follow Up; a View People can contain Names: Peter, Jack, Barbara, Tiffany, Mark and Ken. It is recommended, that a user starts working with the structure as shown on the FIG. 2, without using Names from contexts other than Global. When a user perceives a need for differentiating the meaning of a particular word in different contexts, then he/she can use different contexts. For example, a View People may contain names of the people from the business: Peter, Jack, Barbara, Tiffany, Mark and Ken. A user may enter an Item with the text "Call Barbara at 2:30 PM", meaning to call the user's wife, whose first name is Barbara, which is the same as the first name of a coworker of the user. The system assigns the Item "Call Barbara at 2:30" to Barbara from the business, because it doesn't know about user's wife. Now, to the user may add Barbara from View People, to a new Context Home. In effect, Barbara will be related to two Contexts, namely Work and Home. Categorizing Information.

A user enters information to the system through Items 11 (109). Items are entered on the View Form (screen), as in FIG. 18. A user may enter the Items 11 (109) for a Name 9 (106, 108). Each Item may be assigned 10 to many Names (106, 112). The full structure of the database system is shown on FIG. 3.

A user can create as many Contexts and Views as he/she wishes. Many Names can be assigned to each View. Likewise, many Items can be assigned to each Name There is no limit on how many of these elements can be created.

Contexts, Views and Names together create Categories 12. All Categories 12, all Items 14 and all many-to-many connections 13 between Categories and Items in the Database are stored in a Database called Neuron. The simplified structure of the Database is depicted in FIG. 4.

Figure 3:
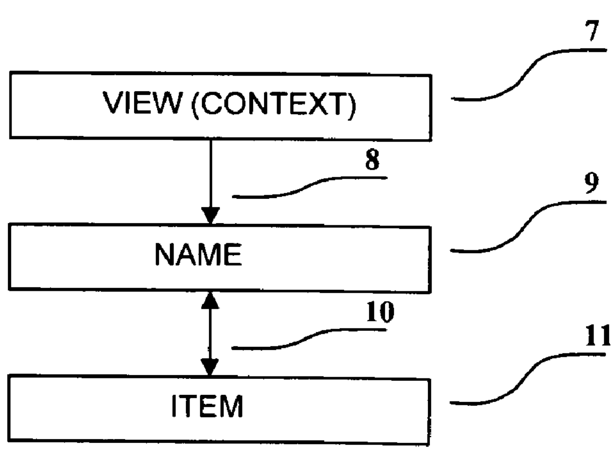
FIG. 3 shows a structure of a database information model according to principles of the invention.
Figure 4:
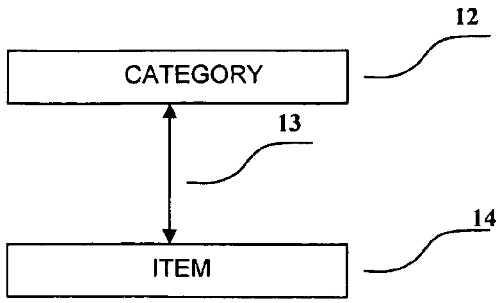
FIG. 4 shows a simplified structure of a database information model according to principles of the invention.
Figure 5:
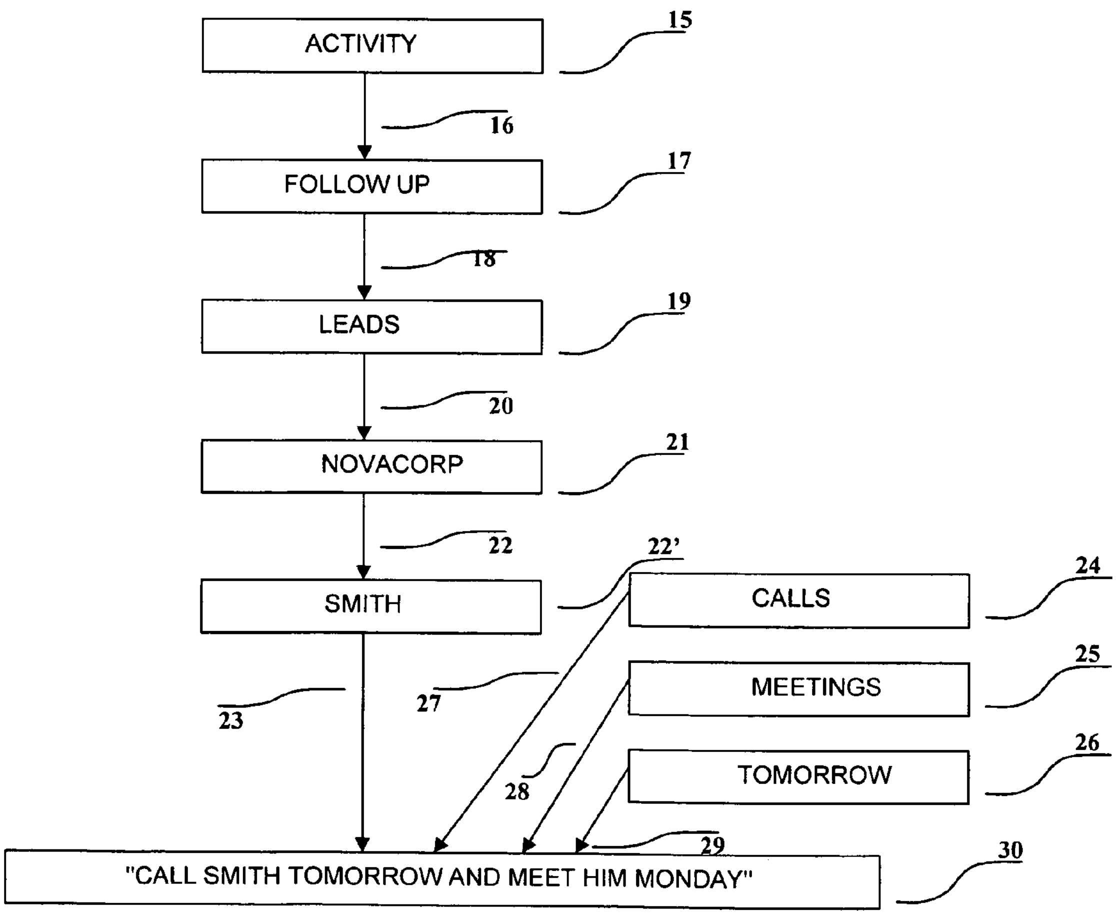
FIG. 5 shows a structure of a sample category classification according to principles of the invention.

Referring now to FIGS. 3 and 4 the structure of the Database, which is totally flexible and extendible, is shown. Many levels of classification can be created. For example, categories and an Item can be structured as shown in FIG. 5, where arrows 16, 18, 20, 22, 23, 27, 28 and 29 depict physical pointers between specific categories/items. These pointers are merely one possible physical implementation of relationships. In the example of FIG. 5, there are five categories: Activity 15, Follow Up 17, Leads 19, NOVACORP 21, Smith 22' and an Item "Call Smith tomorrow and meet him Monday" 30. Each of the categories can become a View and/or a Name. At the time of entry, the Item "Call Smith tomorrow and meet him Monday" is automatically assigned to other categories: Calls 24, Tomorrow 26, Meetings 25; and other standard (not shown here) date categories: Tomorrow's Date, Monday (next) and next Monday's Date. All categories can have their own structures or can participate in any structures. Together, all category structures in the Database reflect a user's own information network.

Elements of Simplified Database

Figure 6:
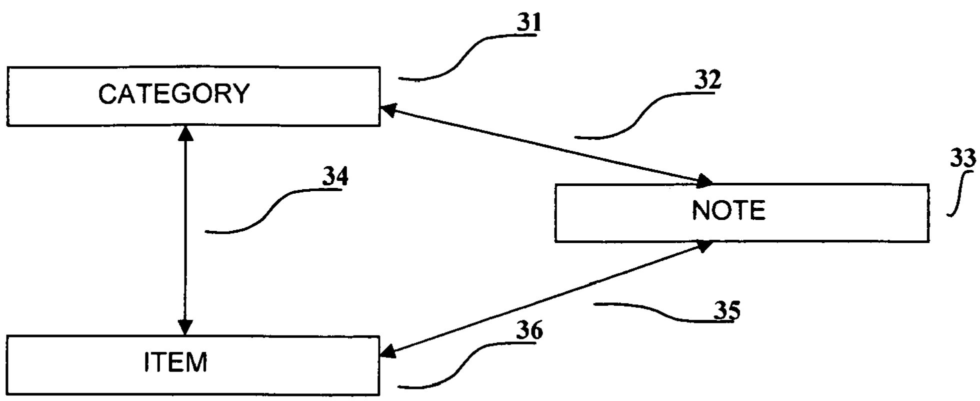
FIG. 6 shows elements of a simplified database information model according to principles of the invention.

Categories 31 and Items 36 are described above. They are the most frequently used elements of Database. Notes 33 are the next element of Database. Notes are not utilized in automatic assignments, like Items and Categories, but are used to store additional information attached to any Category or Item. While Items are limited in size, to make their processing efficient, Notes are actually unlimited in size. One note can have many pages, and one page contains approximately one printed page of text in the preferred embodiment. The number of notes can be practically unlimited. Notes are attached 32, 35 to Categories and Items, but there can also be Notes alone, not connected to any other element of the Database. However, it is recommended that Notes are attached to at least one Category or Item, so that they can be easily found out. Otherwise, a user may have to remember a Note's identifier, or may have to scan all notes, to find the right one. FIG. 6 shows how the Notes relate to other elements of Database.

The Simplified Database is made up of Items, Categories and Notes. All of these database elements can be related to each other 32, 34, 35 in many-to-many relationships.

Elements of a Database

Figure 7:
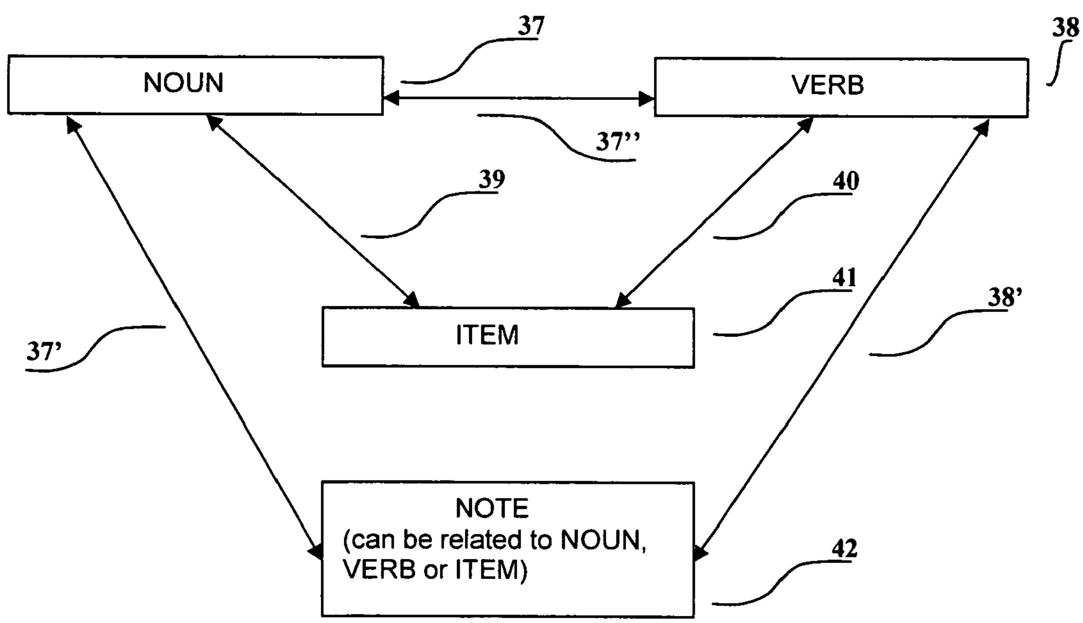
FIG. 7 shows Elements of a Database according to principles of the invention.

The basic configuration of the Database allows storage of any information. Categories are divided into Nouns and Verbs. A part of the Database is called the Noun 37 branch, because all parts in this part are nouns. A similar structure is created for verbs. This part of the Database is called the Verb 38 branch. The full Database contains both branches being connected by Item 41. Use of one or both branches constitutes use of the Database. FIG. 7 shows how all three elements (i.e., Nouns, Verbs and Items) relate to each other in the Database. Additional long pieces of text are stored in Notes 42. The many-to-many relationships 37'', 39, 40, 37' and 38' relate elements of the Database to each other.

Sample of a Better Database

In any information management system developed on the four element Database as shown in FIG. 7, the branches become more complicated as branch relationships and relationships between the branches are stored.

Full implementation of the invention should preferably create two databases:

one without Items—called a Dictionary and one with Items—called Reality.

Figure 8:
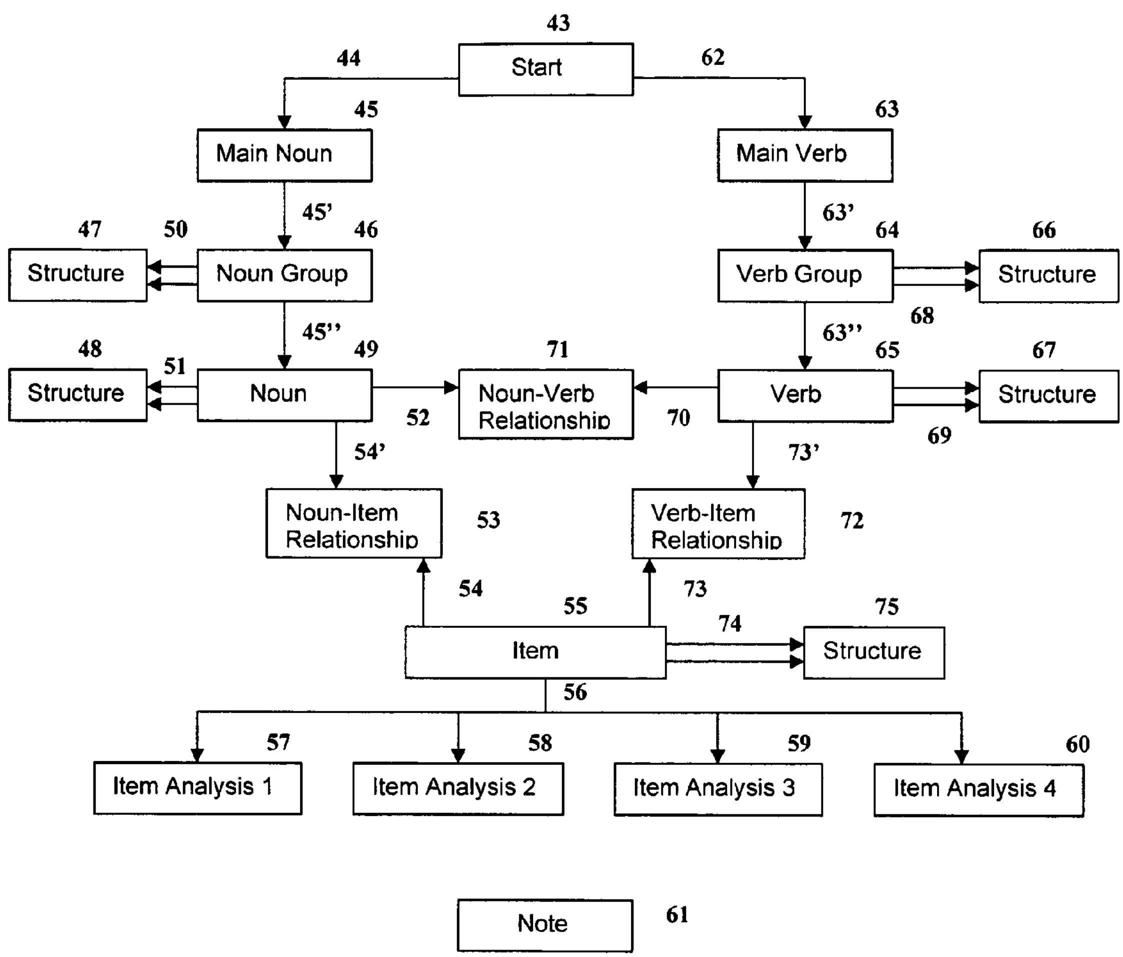
FIG. 8 shows a realistic schema of a database for reality, with a dictionary that reuses reality elements according to principles of the invention.

FIG. 8 shows a possible implementation of the Database developed with Items. The database has a Start 43 record, which is used as the owner of the sets 44 and 62 for sequential retrieval of Main Noun 45 and Main Verb 63 records.

The Noun Branch classifies and stores hierarchical and network relationships between elements of the Noun Branch. Main Noun record 45 owns a collection 45' of Noun Group Records 46. Noun Group 46 owns collection 45'' of Noun Records 49. Structure Record 47 stores many-to-many relationships 50 between Noun Group Records 46. These relationships 50 are implemented as a double set from Noun Group Records 46 to Structure Record 47. Structure Record 48 stores many-to-many relationships 51 between Noun Records 49. These relationships 51 are implemented as a double set from Noun Records 49 to Structure Record 48. Item Record 55 is related many-to-many to the Noun Record 49 via Noun-Item Relationship Record 53 and relations 54 and 54'.

A Verb Branch classifies and stores hierarchical and network relationships between elements of the Verb Branch. Main Verb record 63 owns a collection 63' of Verb Group Records 64. Verb Group 64 owns a collection 63'' of Verb Records 65. Structure Record 66 stores many-to-many relationships 68 between Verb Group Records 64. These relationships 68 are implemented as a double set from Verb Group Records 64 to Structure Record 66. Structure Record 67 stores—many-to-many relationships 69 between Verb Records 65. These relationships 69 are implemented as a double set from Verb Records 65 to Structure Record 67. Item Record 55 is related many-to-many to the Verb Record 65 via Verb-Item Relationship Record 72 and relations 73 and 73'.

Structure Record 75 stores many-to-many relationships 74 between Item Records 55. These relationships 74 are implemented as a double set from Item Records 55 to Structure Record 75.

Noun Record 49 is related many-to-many to the Verb Record 65 via Noun-Verb Relationship Record 71 and relations 52 and 70.

Item 55 is further analyzed into Item Analysis Records. The schema has Item Analysis Records 57, 58, 59 and 60. Item Analysis Records are related to Item Record 55 via relation(s) 56. These relations may be implemented as a single set or multiple sets.

Note Record 61 in the schema is not related directly to Noun 49, Verb 65 or Item 55. There are direct relations, but for efficiency reasons they are implemented as direct Noun 49, Verb 65 or Item 55 key duplication in Note Record 61.

Theory Behind the Database

The Database follows theoretically the analysis of sentences in any language. Full sentences in any language contain Nouns, Verbs and quantified information about the noun operated by the verb. Such quantified information can be fully analyzed. Some sentences are not fully quantified, but logically they still follow the full model. (Parts are less than the whole).

By definition, elementary information is a simple sentence describing a state of an observed event or process.

Quantified elementary information, by definition, is a sentence with an argument describing a result of measuring of an object state. In the most complicated form, quantified elementary information contains results with discrete measurement results.

Name = Number

{ <=, >=, <, > } (any of)

Where:

Name—name for the Number

Number—Real Number

=, <=, >=, <, >—functors creating sentences, semantics like in theory of real numbers Quantified elementary information is separated into three parts:

Noun,

Verb,

Item.

Noun and Verb are based on the Name, and Item contains the Number.

Figure 9:
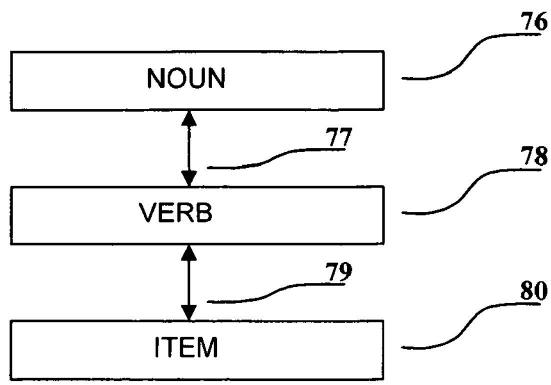
FIG. 9 shows a quantified elementary information according to principles of the invention.

Using network data model notation (CODASYL) the model in FIG. 9 directly translates quantified elementary information into a database language. Noun 76 is in a many-to-many relationship 77 with Verb 78. Verb 78 is in a many-to-many relationship 79 with Item 80. This global data model is followed in all databases for quantified elementary information.

While the analysis described above has mainly theoretical significance, in practice, it can be used to estimate the Database size.

Figure 10:
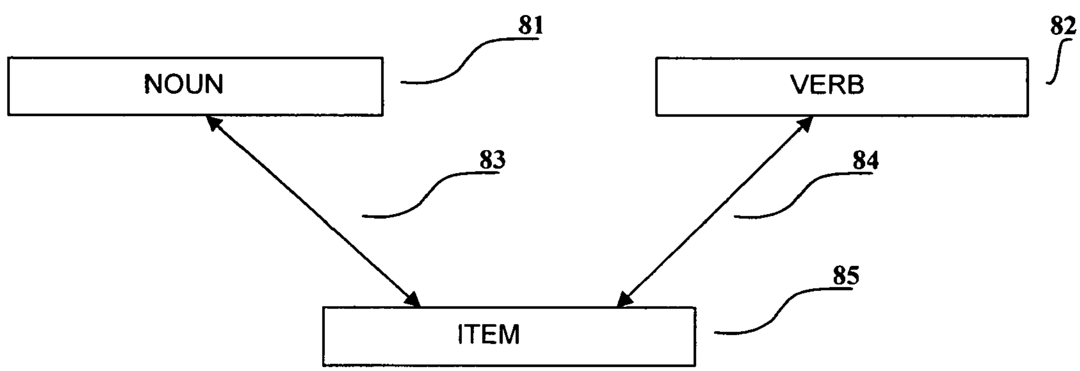
FIG. 10 shows elements of the quantified elementary information according to principles of the invention.

In practical application, the following schema should be utilized, according to FIG. 10. It is based mostly on the type of query directed towards the database. Also, in reality, multiple Nouns in quantified elementary information databases are analyzed in same Verbs—so Verbs become independent of Nouns. Noun 81 is in many-to-many relationship 83 to Item 85. Verb 82 is in many-to-many relationship 84 to Item 85.

The Database is made of Nouns, Verbs and Items. What is critical, are the relationships between the basic elements of the sentence. Names given to the basic elements of the sentence are here only for clarity of definition. The essence of this design is the relationships between the parts of the analysis, not the specific names for them.

Based on the aforementioned, in FIG. 10, a schema using a network model notation and systems based thereon will be built. In reality all the elements of the diagram can be refined into finer detail to accommodate higher speed retrieval within databases and to simplify the navigation in specific databases for a specific area of knowledge being analyzed.

To accomplish conversion from network model to relational model of databases, two relations are defined:

1. Relation R1: N R1 V—in Noun N exists Verb V
2. Relation R2: V R2 I—in Verb V exists Item I These two relations must coexist for the same set of Verbs, which is closed on the Product operation.

To have properly build the database, two thesis have to be true:

1. Each Item in the database has to be assigned to a Verb or combination of Verbs.
2. Each Verb has to be assigned to a Noun or combination of Nouns.

Simply speaking, there are no Items with nonexistent Verbs and/or Nouns. The reverse functions also cooperate.

Basic Cross-Referencing Algorithms of the Database

Basic algorithms of the Database traverse the fully developed Noun and/or Verb branches to access the Items. Items by themselves can be accessed in a regular sort (index) sequence. To utilize the power of the Database, the retrieval queries have to limit the number of retrieved Items based on the query parameters.

Figure 11:
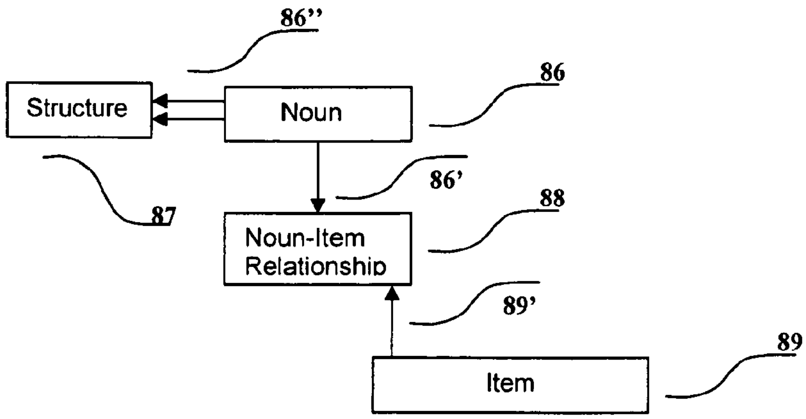
FIG. 11 shows an illustration for the basic retrieval algorithm according to principles of the invention.

A sample of the Noun Branch is depicted in FIG. 11. The basic query reads a Noun 86 as the specified View, takes it as the head of the Structure list 87 and scans all the elements belonging to the list using the Structure record and the connecting sets 86". The elements of the View list create the headings 92 of the result spreadsheet in FIG. 12. Then, for a specified Name 94 with Context 94" treated as the head of another list, it reads all the elements belonging to the Name list using the Structure record 87 and the connecting sets 86". Then, the connecting sets 86' and 89' and Noun-Item Relationship Record 88 is used to find out all Items 89 (93) belonging to the Name list elements. All the Nouns 86 for these Items are read and if any of the these Nouns appear on the list as specified in the heading 92, then such Noun 86 (91) is printed in the intersection of the Item 89 (93) and the heading 92. The same algorithm may be used to traverse the Verb Branch.

If the Database schema is developed as in FIG. 8, then the basic algorithm can be extended to utilize the classifications of Nouns (Verbs), which are the records 45, 46 (63, 64) above the main Noun (Verb) records 49 (65).

Figure 12:
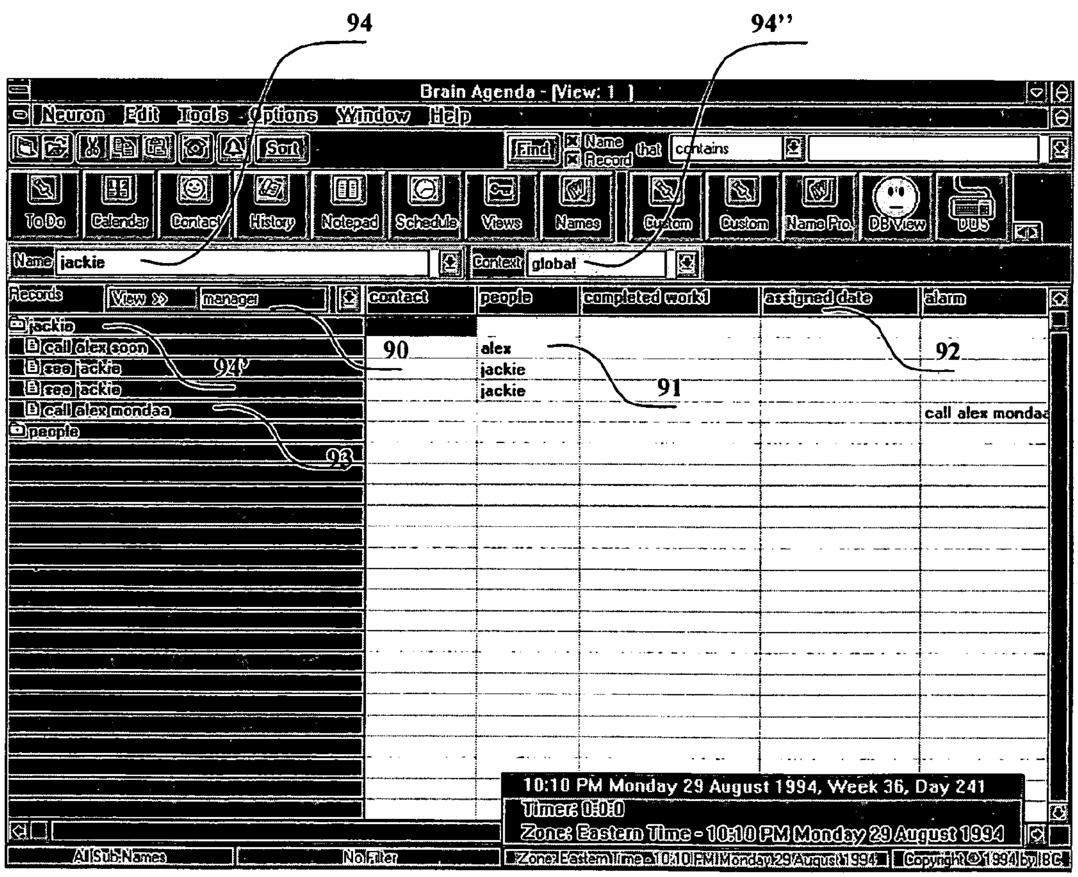
FIG. 12 shows dimensional query results of the basic retrieval algorithm according to principles of the invention.

The screen printout in FIG. 12 illustrates results of the queries. The expected result of the query is a logical intersection of View 90 with Name 94. Each returned Item 93 belongs to sets: one is the View set 90 or its sub-name 92 and another is the Name set 94 or its sub-name 94'. Accordingly, a user is presented only with Items 93 that fulfill this two dimensional query parameters.

Self Learning Algorithms of the Database

Referring to FIG. 11, the lists 86", 86', 89' mentioned above for the Basic Cross-Referencing Algorithms of the Database are ordered by key value in records Structure 87 and Noun-Item Relationship Record 88. This applies to all Structure and Relationship Records in all Figures. Every time the specific link between the lists is utilized, the key value is incremented by a discrete count. This count can be also inputted by a user on request. This organizes the list and strengthens the connection between the list head and its element. The next time the same list is read, the higher count, i.e., stronger elements, are read first. This constitutes a self-learning process of the Database.

Figure 13:
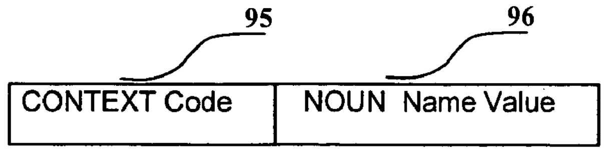
FIG. 13 shows a basic structure of a Noun (Verb) record according to principles of the invention.

A basic structure of Noun (also Verb) record is presented in the FIG. 13. It contains Context Code 95 and Noun (Verb) Name Value 96. For example, Context Code 0 (zero) for Global Context and Name with value 'New York'.

Figure 14:
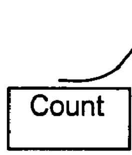
FIG. 14 shows a basic structure of a Relationship (or Structure) record containing usage count or certainty factor according to principles of the invention.
Figure 15:
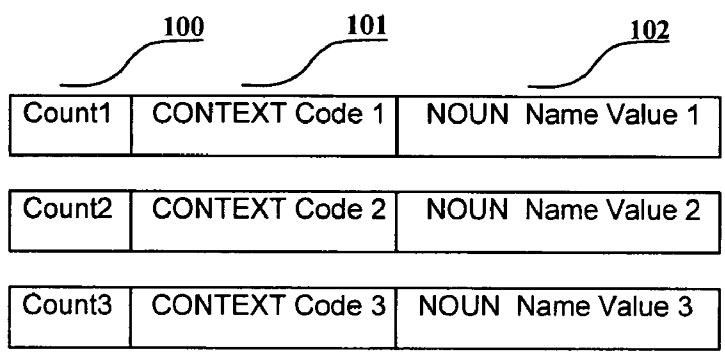
FIG. 15 shows a product of Nouns (Verbs) and a structure of Nouns (Verbs) with three elements according to principles of the invention.
Figure 16:
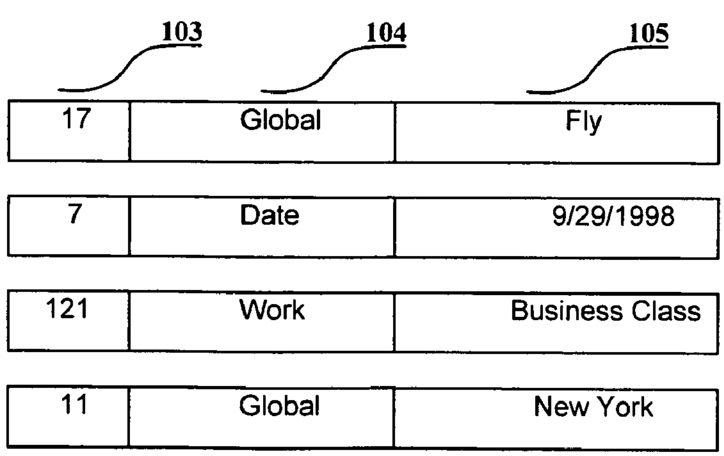
FIG. 16 shows an example of product of Nouns (Verbs) and a structure of Nouns (Verbs) with four elements according to principles of the invention.

FIG. 14 shows minimal content of the Relationship (or Structure) record containing a usage count or certainty factor 97. The Noun (Verb) data is a Product of any number of multiple other Nouns (Verbs) and their Relationship usage counts 100, as in FIG. 15. Nouns (Verbs) each carry a Context Code 101 and Noun (Verb) Name Value 102. An example given in FIG. 16 contains Noun data, which is built from four other products of Noun Name Values 105 and their Contexts 104, and their relationship count 103.

Name and Context Combo and Spreadsheet Interface to the Database

Figure 18:
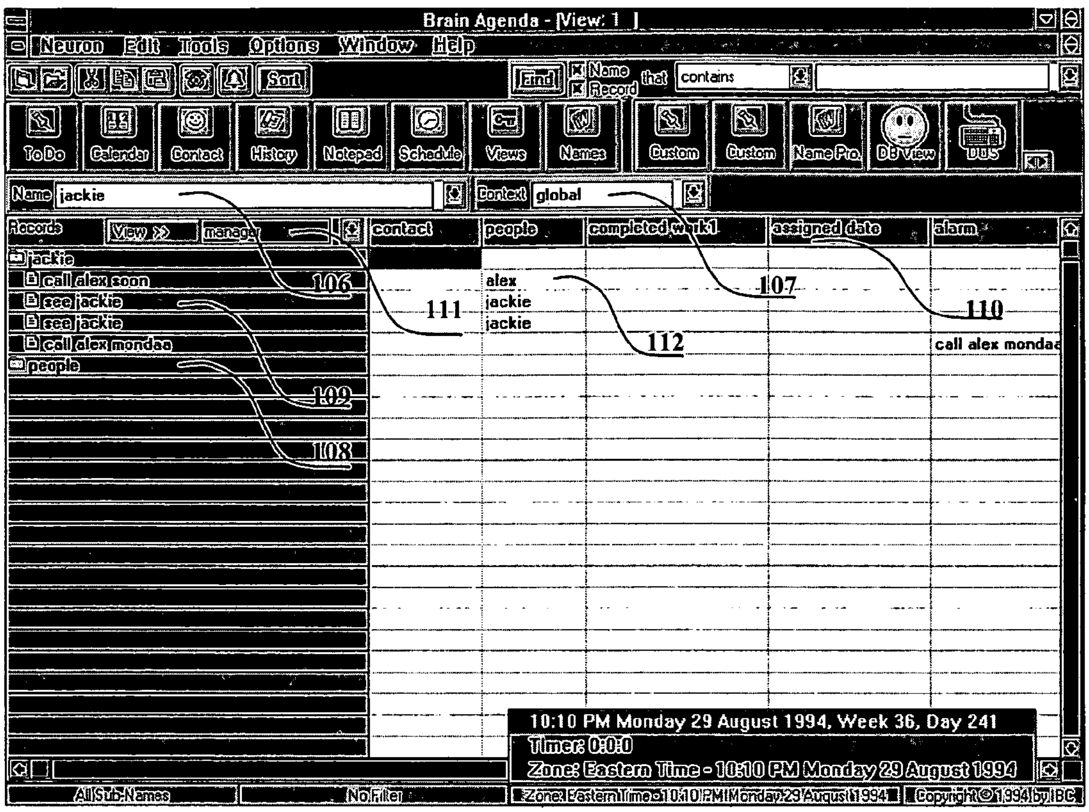
FIG. 18 shows two dimensional query results of a basic retrieval algorithm and elements of the spreadsheet interface, with a Name and Context Combo displayed according to principles of the invention.

Referring to FIG. 18, visual representation of the Database content is provided. Each Name in the Database is stored not only as a value of its content, but also in conjunction with its Context. To let a user view and edit the content of such pair of objects, the Name and Context Combo is developed. In the preferred embodiment, the Combo is represented by means of two closely visually related list boxes: List Box Name 106 and List Box Context 107. In other screens of the preferred embodiment Name and Context Combo can be shown as Name and Context columns of a screen. Other visualizations may display the same content in a different layout.

Referring to FIG. 18, visual representation of the Database content is also provided for multiple hierarchical and other relationships between Categories and Items. Each Name from the Database may have a list of sub-Names 108 (displayed here with the folder picture). These sub-Names may again be related to their sub-Names. Each Name or sub-Name may have Items 109 (displayed here with the page picture) related to them and displayed in proximity of such Name or sub-Name. The list of columns 110 is the list of Names for which a user wants to view relationships to Items. Such list of columns is named as View and such Name 111 is displayed in the View List Box 111. The Name(s) 112 displayed in the cell related to a row and column are the Name(s) relating the name(s) in the column heading 110 to a Name(s) or Item(s) in the related row 109 or 108.

By way of illustration, referring to FIG. 18, Name "jackie" from Context "global" has Items "call alex soon", "see jackie", another "see jackie" and "call alex monday". Name "jackie" from Context "global" has also sub-Name "people". View "manager" has sub-Names (and columns) "contact", "people", "completed work1", "assigned date" and "alarm". Item "call alex soon" is related to column "people" through Name "alex", which is displayed in the intersection of the row for the Item and column for Name "people". Item "see jackie" is related to column "people" through Name "jackie", which is displayed in the intersection of the row for the Item and column for Name "people". Another Item "see jackie" is related to column "people" through Name "jackie", which is displayed in the intersection of the row for the Item and column for Name "people". Item "call alex monday" is related to column "alarm" through Name "call alex monday", which is displayed in the intersection of the row for the Item and column for Name "alarm".

A preferred embodiment is implemented using a Microsoft Windows® compatible computer. On such computer, Network Model Database Manager software is installed. A database definition for the Network Model Database Manager is stored in a Data Definition Language format file. An existing embodiment is BrainAgenda™ Personal Information Manager software <http://www.brainagenda.com/>. The Data Definition Language format file is created using RAIMA® Network Model Database Manager. FIG. 17 shows the Data Definition Language format file specific to and working with RAIMA® Network Model Database Manager. The Data Definition Language format file stores the database definition, which directly relates to some claims of the invention. This file is called a Schema of the Database.

Computer Database Manager Listing for the Database Design is represented in FIG. 17. This is a Network Model Database design using a RAIMA® Database Manager. The Database Design may be directly implemented in a specific computer by supplying the Listing to the RAIMA® Database Manager. This schema is the implementation of a realistic schema of the Database for Reality as shown in FIG. 8. Additional elements included in the schema and not represented in the FIG. 8 are utilized mostly for performance improvement.

In FIG. 17 all lines and each string starting with two characters/(forward slash) and * (asterisk) and ending with * (asterisk) and/(forward slash) are the comment lines or strings. Comment string contains text which helps a database analyst understand database features. Comment text is irrelevant to the database manager interpretation of the database definition.

References are made herein by the name of the element as it is used in the FIG. 17. The database BRAIN is defined with a page size of 6144 bytes of storage. The file F100010.00 contains records of type noun. The file F100011.00 contains records of type datar and datar_tabl. The file F100012.00 contains records of type noun_datar, noun_str, noun_synonim, datar_str, action_before and action_after. The file F100019.00 contains records of type brain and note. The key file F100010.00K contains keys of type noun.id. The key file F100011.00K contains keys of type datar.id. The key file F100019.00K contains keys of type note.id.

Field types are defined as per C programming language conventions as char (character) with length in brackets, long (numerical) and double (numerical, with double size). The struct keyword is used to designate the structure name, which includes multiple fields. The structure name may be used in a programming language (for example, C) to manipulate the whole named group of fields instead of single fields. The structure name does not change the way the included fields behave.

Definition for record type brain contains multiple fields db_path, db_name, type_v, kname_v, subtype_v, name_v, type_n, kname_n, subtype_n, type2_n, kname2_n, subtype2_n, name_n, read_action, next_1, next_2, next_3, value_1, value_2, value_3, double_1, double_2, double_3, reserve_1, reserve_2, free, which are not specifically related to the invention. These fields are defined for ease of programming to store some additional information related to the database as a whole.

The definition for record type brain also contains contains groups of fields id_v and id_n.

The definition for record type noun contains multiple fields type, kname, subtype, type2, kname2, subtype2, name, type_p, kname_p, subtype_p, cf, delete, joint_id, read_action, date_create, date_when, date_done, date_start, date_end, short_name, cat_type, exclusive, settings, layout_link, type_link, kname_link, subtype_link, type_note, kname_note, subtype_note, position_note, free_1, free_2, reserve_1, reserve_2, reserve_3.

Definition for record type noun also also contains groups of fields id, id_p, id_link and id_note. Group of fields id relates to basic structure of Noun (Verb) as shown in FIG. 13. CONTEXT Code 95 relates to field type, NOUN Name Value 96 relates to field kname. Field kname contains first 40 bytes of the full NOUN Name Value 96. Field name contains all 255 bytes of the NOUN Name Value 96. In a preferred embodiment a product of Nouns (Verbs) and Structure of Nouns (Verbs) is implemented with two elements as related to FIG. 15. As related to FIG. 15, CONTEXT Code 1 101 relates to field type, NOUN Name Value 1 102 relates to field kname. Field kname contains first 40 bytes of the full NOUN Name Value 1 102. CONTEXT Code 2 101 relates to field type2, NOUN Name Value 2 102 relates to field kname2. Field kname2 contains first 40 bytes of the full NOUN Name Value 2 102. A definition for record type noun relates directly to Noun 49.

A definition for record type datar contains multiple fields type, kname, subtype, name, cf, delete, joint_id, read_action, date_create, date_when, date_done, date_start, date_end, settings, type_note, kname_note, subtype_note, position_note, long_1, reserve_1 reserve_2, reserve_3, reserve_4.

A definition for record type noun also contains groups of fields id and id_note. Field kname contains first 40 bytes of the full Item 55. Field name contains all 255 bytes of the Item 55. Definition for record type datar relates directly to Item 55.

A definition for record type datar_tabl contains multiple fields elem, cf, delete, date_create, read_action, double_1, reserve_1, reserve_2.

A definition for record type note contains multiple fields from, type, kname, subtype, page_nr, name, cf, chapter, chapter_1, chapter_2, chapter_3, chapter_4, chapter_5, chapter_6, verse, page, delete, read_action, reserve_1, reserve_2, reserve_3, reserve_4.

A definition for record type note also contains group of fields id. Field kname contains the first 40 bytes of the full page. Field page contains all 5000 characters of a page of text stored in the database. The definition for record type note relates directly to Note 61.

A definition for record types noun_str, noun_datar, datar_str contains multiple fields cf, date_create, read_action, double_1, reserve_2, reserve_3. Field cf relates to basic structure of Relationship (or Structure) record containing usage count or certainty factor as shown in FIG. 14 Count 97. In the Preferred Embodiment a product of Nouns (Verbs) and Structure of Nouns (Verbs) is implemented with elements as related to FIG. 15. As related to FIG. 15, Count 1 or Count 2 or Count 3 100 relates to field cf. The definition for record types noun_str, noun_datar, datar_str relates directly to Structure records 48, 53, 75.

A definition for record types action_before, action_after, noun_synonim contains multiple fields cf, date_create, read_action, double_1, reserve_2, reserve_3.

All sets in the schema are ordered descending by the cf fields from the member records.

A definition for set noun_set contains record brain as the owner and record noun as the member.

A definition for set datar_set contains record noun as the owner and record noun_datar as the member.

A definition for set datar_noun_set contains record datar as the owner and record noun_datar as the member.

A definition for set noun_synonim_exp_set contains record noun as the owner and record noun_synonim as the member.

A definition for set noun_synonim_imp_set contains record noun as the owner and record noun_synonim as the member.

A definition for set noun_exp_set contains record noun as the owner and record noun_str as the member.

A definition for set noun_imp_set contains record noun as the owner and record noun_str as the member.

A definition for set datar_exp_set contains record datar as the owner and record datar_str as the member.

A definition for set datar_imp_set contains record datar as the owner and record datar_str as the member.

A definition for set action_before_exp_set contains record noun as the owner and record action_before as the member.

A definition for set action_before_imp_set contains record noun as the owner and record action_before as the member.

A definition for set action_after_exp_set contains record noun as the owner and record action_after as the member.

A definition for set action_after_imp_set contains record noun as the owner and record action_after as the member.

A definition for set datar_tabl_set contains record datar as the owner and record datar_tabl as the member.

Operation

Algorithms of a database as described herein are implemented in BrainAgenda™, available at <http://www.brainagenda.com/>. Specific source code of programs which perform the algorithms is written for the current usage of the database in the Personal Information Manager operation.

The basic algorithms of the Database traverse the fully developed Noun and/or Verb branches to access the Items. Items themselves can be accessed only in a regular sort (index) sequence. To utilize the power of the Database, retrieval queries have to limit the number of retrieved Items based on the query parameters. FIG. 12 illustrates results of a query. The expected result of the query is a logical intersection of View (and Context) with Names (and their Contexts). Each returned Item belongs to two sets: one is the View set and another is the Name set. Thus the user is presented only with Items that fulfill said two dimensional query parameters.

Referring to FIGS. 8, 12 and 18, the basic query reads a Noun Record (49, noun) as the specified View (111), takes it as the head of the list and scans all the elements belonging to the list using the STRUCTURE (48, noun_str) record. The elements of the View list create the headings (110) of the result spreadsheet. Then, for the specified Name (and Context) reads a Noun Record (49, noun) treated as the head of another list it reads all the elements (108) belonging to the Name list using the STRUCTURE (48, noun_str) record. Then, for all the Items (55, datar, 109) belonging to the Name list elements all the Nouns (49, noun, 112) are read and if any of the the Nouns appear on the list which head is specified in the heading (110), then such Noun is printed in the intersection (112) of the Item and the heading.

The same algorithm as described above may be used to traverse the Verb branch. The basic algorithm can be extended to utilize the classifications of Nouns (Verbs)—the records above the main Noun (Verb) records.

OTHER EMBODIMENTS

Intelligent Device—Description

An intelligent Device has to have a Knowledge Bank. The Knowledge Bank may be implemented in a computer by utilizing a database according to the invention.

Intelligent Device—Operation

As discussed above, an intelligent Device has to have Knowledge Bank. The Knowledge Bank may be implemented in a computer by utilizing database operation algorithms as described in this invention.

Accordingly, it can be seen that a database design according to the invention allows a system, which uses the invention, to perform highly effective storage of any number of pieces of information and their relationships to other pieces of information. As such the invention may be, and is, utilized for storage of dissimilar pieces of information in practical implementations especially useful for Information Managers and Knowledge Banks.

Although the description of the invention embodiment contains many specificities, these should not be construed as limiting the scope of the invention but as merely providing illustrations of some of the presently preferred embodiments of this invention. Various other embodiments and ramifications are possible within invention's scope. For example, this database design allows a system, which uses the invention to perform highly effective storage of any language sentences (languages different than English). Above that, it also performs functions similar to human brain, namely, it stores unlimited number of connections between pieces of information, automatically cross-references them and self-organizes them according to any learning pattern, for example, frequency of usage of a piece of information in relationship to other pieces of information.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Any computer system with means of implementing the invention is considered to contain the invention.

The scope of the invention should be determined by the appended claims and their legal equivalents, rather than by the examples given.

What is claimed is:

1. A network model database system adapted to categorize and store information, comprising:

a database schema including a plurality of primary branches, each primary branch including a plurality of record types and sets that connect the record types, each record type including a context code and a phrase value, said record types including a noun record type, a verb record type and an item record type, and a plurality of relationship branches establishing a relationship between each one of the plurality of primary branches and each other of the plurality of primary branches, each relationship branch includes a plurality of record types, said record type connecting primary branches and being configured to store relationship information between primary branches; and said noun record type sharing relationship branches with each of said verb and item record types, and said verb record type sharing relationship branches with each of said noun and item record types, and said item record type sharing relationship branches with each of said verb and noun record types, and a user interface configured for entering data, said system being configured to automatically cross-reference the data and perform self-learning of relationship for the data.

2. A network model database system according to claim 1, wherein the sets define relationships from a record type to another record type.

3. A network model database system according to claim 1, wherein each set defines a relationship from a record type to another record type according to an association from the group consisting of one to one, one to many, many to one, many to many, zero to one, zero to many, one to zero, and many to zero.

4. A network model database system according to claim 3, wherein each record type includes a context code and a phrase value.

5. A network model database system according to claim 4, wherein each phrase value is a value from the group consisting of a null value, a word and a plurality of words.

6. A method for categorizing and storing information in a network model database according to claim 1, said method comprising:

entering data with a user interface;

automatically cross-referencing the data; and performing self-learning of relationships for the data.

* * * * *